US008421586B2

(12) United States Patent
Sejkora

(10) Patent No.: US 8,421,586 B2
(45) Date of Patent: Apr. 16, 2013

(54) LAMP-OPERATING APPLIANCE FOR OPERATING ONE OR MORE LIGHT-SOURCES AND PROCESS FOR OPERATING A LAMP-OPERATING APPLIANCE

(75) Inventor: Guenther Sejkora, Schwarzenberg (AT)

(73) Assignee: Ledon Lighting GmbH, Dornbirn (AT)

( * ) Notice: Subject to any disclaimer, the term of this patent is extended or adjusted under 35 U.S.C. 154(b) by 1008 days.

(21) Appl. No.: 12/443,134

(22) PCT Filed: Aug. 9, 2007

(86) PCT No.: PCT/EP2007/007065

§ 371 (c)(1), (2), (4) Date: Apr. 28, 2009

(87) PCT Pub. No.: WO2008/037323

PCT Pub. Date: Apr. 3, 2008

(65) Prior Publication Data

US 2010/0007514 A1 Jan. 14, 2010

(30) Foreign Application Priority Data

Sep. 27, 2006 (DE) ........................ 10 2006 045 744

(51) Int. Cl.
*G05B 19/02* (2006.01)

(52) U.S. Cl.
USPC .......................................... 340/4.3; 315/312

(58) Field of Classification Search .................. 340/1.1, 340/4.3
See application file for complete search history.

(56) References Cited

U.S. PATENT DOCUMENTS

| | | | |
|---|---|---|---|
| 7,024,119 B1 | 4/2006 | Mier-Langner et al. | |
| 2006/0132065 A1 * | 6/2006 | Sears et al. .................... | 315/312 |
| 2006/0193133 A1 * | 8/2006 | Von Der Brelie ............. | 362/276 |

FOREIGN PATENT DOCUMENTS

| | | |
|---|---|---|
| EP | 0 534 710 | 3/1993 |
| WO | WO-2005/117503 | 12/2005 |

* cited by examiner

*Primary Examiner* — Brian Zimmerman
*Assistant Examiner* — Sara Samson
(74) *Attorney, Agent, or Firm* — Marshall, Gerstein & Borun LLP

(57) ABSTRACT

The invention relates to a lamp operating device (10) for operating one or multiple light sources (20-1, 20-2), with a first interface unit (15) for connecting the lamp operating device (10) to a control line (2) and for receiving external control commands corresponding to a first communications protocol, and with a control unit (11) which operates the light source(s) (20-1, 20-2) in accordance with the control commands received via the first interface unit (15). A second interface unit (17) is provided for receiving programming information according to a second communications protocol, wherein the conversion of the control commands received via the first interface unit (15) for operating the light source(s) (20-1, 20-2) is performed by the control unit (11), at least partially taking into account the programming information.

17 Claims, 2 Drawing Sheets

Fig. 3

| | Scene 1 | Scene 2 | Scene 3 | Scene 4 | ... | Scene 16 |
|---|---|---|---|---|---|---|
| Intensity | 100% | 100% | 100% | 100% | ... | 50% |
| R component | 33% | 100% | 0% | 0% | ... | 60% |
| G component | 33% | 0% | 100% | 0% | ... | 20% |
| B component | 33% | 0% | 0% | 100% | ... | 20% |
| Angle α | - | - | - | - | - | - |
| Angle β | - | - | - | - | - | - |
| Distribution | - | - | - | - | - | - |

Fig. 4

| | Scene 1 | Scene 2 | Scene 3 | Scene 4 | ... | Scene 16 |
|---|---|---|---|---|---|---|
| Intensity | 100% | 100% | 80% | 70% | ... | 50% |
| R component | - | - | - | - | - | - |
| G component | - | - | - | - | - | - |
| B component | - | - | - | - | - | - |
| Angle α | 0° | 30° | 45° | 0° | ... | 60° |
| Angle β | 0° | 0° | 45° | 30° | ... | 60° |
| Distribution | 255 | 255 | 122 | 122 | ... | 64 |

LAMP-OPERATING APPLIANCE FOR OPERATING ONE OR MORE LIGHT-SOURCES AND PROCESS FOR OPERATING A LAMP-OPERATING APPLIANCE

BACKGROUND OF THE INVENTION

1. Field of the Invention

The present invention relates to a lamp-operating appliance that is provided for operating one or more light-sources and that exhibits a first interface unit via which external control commands are communicated to the lamp-operating appliance. Furthermore, the present invention relates to a process for operating a corresponding lamp-operating appliance.

2. Related Technology

In modern lighting systems, light fixtures frequently come into operation, the light effect of which can be changed in a manner depending on the wishes of a user of the lighting system. In a simple embodiment, there is, for example, the possibility to switch the light fixtures on and off and also to vary their brightness by remote control. In this connection, an idea that has recently gained acceptance, in particular, is to drive the light fixtures for the purpose of brightness control by means of digital commands.

This digital drive of light fixtures or of lamp-operating appliances assigned to the light fixtures for operating the light-sources has been facilitated, in particular, by the development of the so-called DALI (Digital Addressable Lighting Interface) standard. This is a digital standard in the field of light control, which in comparison with previous processes for driving light fixtures—for example, the known 1-10 volt interface—offers enhanced convenience for intelligent light control. The DALI standard represents a new interface definition which has been developed, in particular, for the purpose of driving electronic ballasts (EB) for operating gas-discharge lamps. Within the scope of this standard, the operation of EBs—or even of other lamp-operating appliances—can be carried out in digital form, in which connection there is the possibility, in particular, to drive lamp-operating appliances via addresses allocated to them individually or in groups and to adjust the light-sources assigned thereto in their brightness. Other standards (for example, DMX) for driving lamp-operating appliances are also known.

The DALI standard referred to previously was primarily developed in order to undertake a brightness control of the light-sources. Accordingly, a limited set of control commands is available which, in particular, relates to the brightness control of the light-sources. However, modern light fixtures have meanwhile also opened up the possibility of adjusting other parameters. For instance, light fixtures are known in which not only the total intensity of the radiated light can be influenced, but also the direction of radiation, the light distribution or the color of the emitted light. For example, a color control or color-temperature control is made possible in straightforward manner by the light fixture exhibiting several heterochromatic light-sources, in which case the light-sources can each be individually adjusted in their brightness, in order to obtain a mixed light in a desired hue.

A remote-controlled change of color of the light of individual light fixtures with the aid of the DALI command set is currently not readily possible, since a corresponding setting option was not initially provided in the development of the DALI standard. A color control could in fact be made possible by a specific address being assigned to each color, so that the individual colors can then be changed individually with appropriate correcting-value commands. However, this would have the result that an individual light fixture in a relatively large lighting system occupies several notional addresses, impairing the clarity of design when driving the light-sources. Furthermore, the known light-control systems only have a limited address space available. That is to say, only a certain number of light fixtures can be driven individually. If several addresses were to be allocated to the light fixtures that are variable in their color, in accordance with the bypass solution described above, this would result in a considerable diminution of the drivable light fixtures.

A further problem consists in the fact that the known operating systems for light-control installations are only suitable to a limited extent to be able to program light fixtures conveniently in which varying parameters are adjustable. Operation is often restricted to a simple retrieval of preprogrammed scenes or routines, for which reason the complex adjustment of modern lamps can only be undertaken with difficulty.

SUMMARY

The object underlying the present invention is therefore to specify a possibility for driving also more modern light fixtures—which offer a large number of setting options—within the scope of known light-control systems. In particular, the possibility is to be opened up to operate light fixtures of such a type within the scope of the known DALI standard.

The invention therefore provides a lamp-operating appliance and a process for operating a corresponding lamp-operating appliance.

The solution according to the invention is based on the idea of programming the lamp-operating appliance in such a manner that a more complex setting of light-fixture-specific parameters is also made possible with the aid of the DALI standard or generally with the aid of a command set for the digital driving of light fixtures. In addition to a first interface unit, which is provided for receiving the digital control commands, the lamp-operating appliance according to the invention therefore exhibits a further interface unit for supplying programming information, the programming information being utilized for adapting the behavior of the lamp-operating appliance to the available setting options in the course of driving the assigned light-source or light-sources in a manner depending on the control commands received. In this way there is the possibility to adapt individually the manner in which the incoming external control commands are interpreted by the lamp-operating appliance and are converted for the purpose of driving the light-source(s). The available commands can accordingly now also be utilized for the purpose of undertaking adjustments, not provided for hitherto, in respect of the assigned light-sources, for example the color or radiation characteristic thereof.

In accordance with the invention, a lamp-operating appliance for operating one or more light-sources is accordingly proposed, which exhibits:

a) a first interface unit for connecting the lamp-operating appliance to a control line and also for receiving external control commands conforming to a first communications protocol;

b) a control unit which operates the light-source(s) in a manner depending on the control commands received via the first interface unit, and c) a second interface unit for receiving programming information in accordance with a second communications protocol, the conversion of the control commands, received via the first interface unit, for operating the light-source(s) being effected by the control unit at least partly by taking account of the programming information.

Furthermore, in accordance with the invention a process is proposed for operating a lamp-operating appliance for one or more light-sources, wherein external control commands for operating the light-sources are communicated to the lamp-operating appliance via a first interface unit conforming to a first communications protocol, and wherein the drive of the light-sources in accordance with the control commands received is effected at least partly by taking account of programming information that was communicated to the lamp-operating appliance via a further interface unit in accordance with a second communications protocol.

The second interface unit may, for example, be designed for connection to a data-transmission line which is separate from the control line and which enables the connection of a programming appliance, in particular a PC. For this purpose the second interface unit may be represented by, for example, a USB interface or an RS232 interface. A wireless reception of the programming information via the second interface unit would also be conceivable, in which case this interface is then preferably designed in the form of a Bluetooth interface or infrared interface.

The first interface unit is, in turn, configured for receiving control commands in accordance with a first communications protocol, in which connection it may be a question, for example, of commands conforming to the DMX standard. The interface unit is preferably designed for receiving control commands conforming to the DALI standard. The programming information communicated to the lamp-operating appliance in accordance with the invention can then be utilized for allocating a new function to certain commands of the DALI standard. Depending on the type of the light-sources to be driven, this means that individual DALI commands can now be utilized selectively for the purpose of influencing certain parameters of the light fixture.

The programming information in this case preferably relates, in particular, to the interpretation of the control unit with regard to the so-called scene commands available in the DALI standard. These commands are initially utilized for communicating to a light fixture that it is to take on a certain preset brightness. However, by appropriate programming of the lamp-operating appliance an extended function is now allocated to these commands, to the effect that other parameters of the light fixture can also be changed by this means. For instance, with the aid of the programming information a set of certain parameter values can be saved which relate not only to the brightness of the light-source but also to the color thereof, the radiation direction thereof and/or the light distribution thereof. In the course of communicating the corresponding scene command via the control line of the DALI bus, accordingly not only the brightness of the light-source is now changed in straightforward manner but a change of the other parameters of the light-source is also undertaken. The advantage of this procedure consists in the fact that the scene commands of the DALI standard that are already available are now utilized for exhausting the setting options of the corresponding light-source individually. In this way the integration of new types of light fixtures into existing lighting systems is also facilitated, since the drive of the already existing light fixtures can be undertaken in the conventional manner, without any restrictions being associated therewith. Accordingly, the present invention opens up the possibility of being able to operate new types of light fixtures or light-sources in straightforward manner by remote control.

BRIEF DESCRIPTION OF THE DRAWINGS

The invention is described in more detail in the following on the basis of the appended drawing: Shown are.

DETAILED DESCRIPTION

Figure 1:
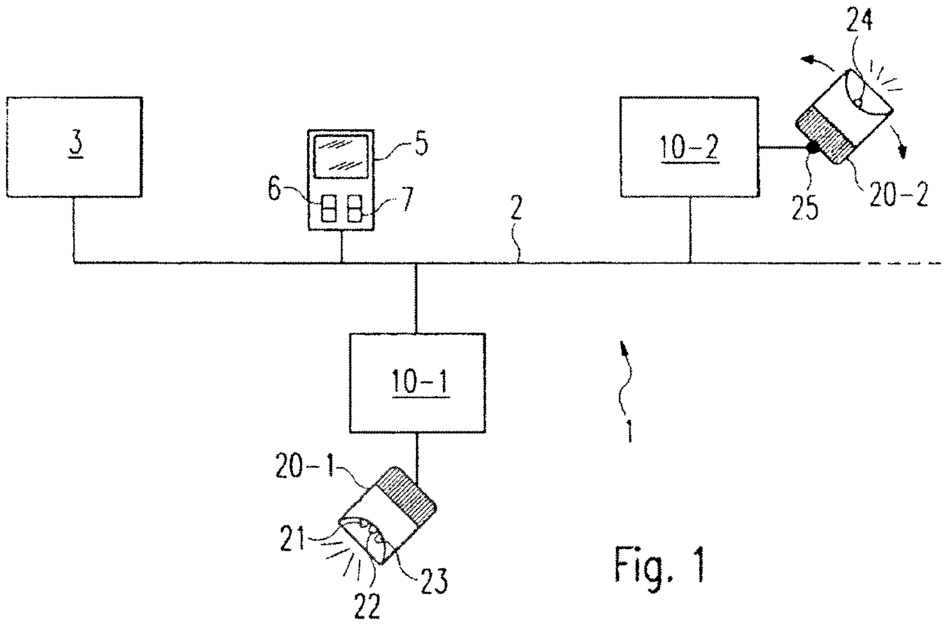
FIG. 1 schematically, the overview of a lighting system in which the lamp-operating appliances according to the invention come into operation.

FIG. 1 shows a control system, provided generally with reference symbol 1, for operating light fixtures, wherein the lamp-operating appliances configured in accordance with the invention come into operation. Represented in the present case are two lamp-operating appliances 10 1 and 10 2, which are each provided for the purpose of driving a light-source 20 1 and 20 2, respectively, assigned thereto. In the exemplary embodiment that is represented, the light-sources are spotlights which—as described in still more detail in the following—offer special setting options, in which connection, however, the present invention is applicable in principle to all types of light fixture.

The lamp-operating appliances 10 1, 10 2 are connected to a common control line 2 which forms a bus line of the control system 1. Via this control line 2, digital commands are communicated to the lamp-operating appliances 10 1, 10 2, which are then converted by the appliances 10 1, 10 2 for the purpose of driving the spotlights 20 1 and 20 2, respectively.

These digital control commands may, for example, be communicated from a central control device 3. In this connection it may be a question of a unit located in a central room of a building to be illuminated, which communicates, in automated and time-dependent manner, certain brightness commands or generally control commands to the lamp-operating appliances 10 1, 10 2. Furthermore, a decentralized drive of the lamp-operating appliances 10 1, 10 2 would also be possible, for which purpose manual input units 5 are arranged in the individual rooms. These units exhibit a display as well as input elements 6 and 7 via which certain parameters of the light-sources 20 1 and 20 2 can be changed manually.

Lighting systems that enable a control of such a type via digital commands are already known from the state of the art. They open up the prospect of an automated and convenient adjustment of the various light-sources and accordingly come into operation, in particular, also for the purpose of illuminating relatively large buildings or plants. The generation and communication of the digital control commands via the control line 2 are effected in this case in accordance with a predetermined communications protocol, whereby, in particular, the protocol may come into operation in accordance with the so-called DALI standard. In this case it is a question of an interface definition that was developed by the leading developers of lamp-operating appliances in order to enable a centralized drive of light-sources arranged in distributed manner. In this connection the DALI standard defines a series of differing digital commands via which individual light-sources can be addressed individually or in groups with the aid of addresses allocated to them, in order to cause them to switch themselves on or off and, in particular, to change their brightness.

By means of the commands made available by the DALI standard, there is accordingly the possibility, in particular, of switching light-sources on and off or of dimming them. The light-sources 20 1 and 20 2 represented in FIG. 1, however, offer setting options going beyond dimming which cannot be readily utilized with the aid of the DALI commands.

Accordingly, the light-source 20 1 is represented by an RGB spotlight which exhibits three heterochromatic individual light-sources 21, 22, 23 in the form of LEDs or generally in the form of light-emitting semiconductor elements which are each individually adjustable in their intensity. By choice of the ratio of the luminous intensities of the three light-sources 21, 22, 23, a mixed light is generated which is variable in its color and which is ultimately emitted by the spotlight 20 1. The commands available in the DALI standard hitherto did not permit an adjustment of the color of the light emitted by the spotlight 20 1 to be undertaken in straightforward manner. Although it would be possible to allocate to each individual light-source 21, 22, 23 a separate address in each instance and then to drive the latter individually, in this case it is a question of a relatively elaborate solution to the problem. A further disadvantage is that the lamp-operating appliance 10 1 would accordingly have to be provided with a plurality of virtual addresses in order to undertake a color control. However, since the number of light fixtures that are addressable in total in the DALI standard is limited, this would result in a reduction of the total number of light fixtures that are useful or drivable.

A comparable problem exists in the case of the second light-source 20 2, which is represented by a spotlight which, although it is only provided with a single light-source 24, is additionally capable of swivelling about an anchorage-point 25 in order to adjust the output of light in a desired direction. No special commands are provided in the DALI standard for this adjustment option either, which should be undertaken by the lamp-operating appliance 10 2. Although also in this case it would be conceivable to undertake the swivelling of the spotlight 20 2 via an additional virtual address, this would again be associated with the disadvantages described previously.

Figure 2:
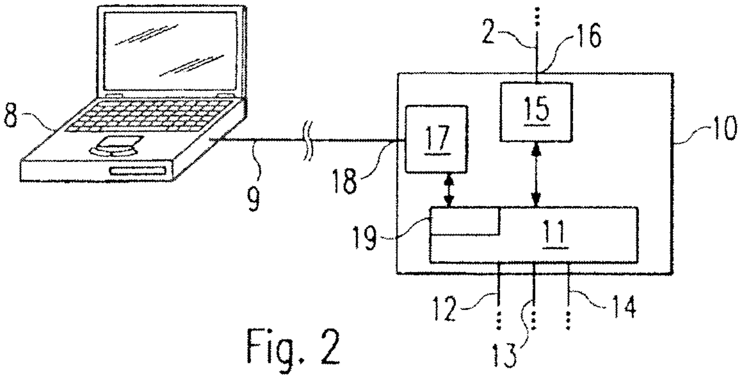
FIG. 2 the more detailed structure of a lamp-operating appliance according to the invention and FIGS. 3 and 4 exemplary embodiments of parameter sets which are saved in the course of programming the lamp-operating appliance.

In order to circumvent this problem, in accordance with the invention there is provision that the lamp-operating appliances 10 1 and 10 2 are specially programmed, in order to be able to utilize the new setting options for the light-sources 20 1, 20 2 also in the DALI standard. This will be elucidated in more detail in the following on the basis of FIG. 2, which shows the special configuration of the first lamp-operating appliance 10 1.

The lamp-operating appliance that is now provided generally with reference symbol 10 exhibits, firstly, a control unit 11 which is provided for the purpose of driving the three heterochromatic individual light-sources 21, 22, 23 and accordingly exhibits outputs 12, 13, 14. Via these outputs 12, 13, 14, corresponding control signals are communicated to the light-sources 21, 22, 23, in order to adjust the latter in their brightness in the desired manner. The drive in this case is effected in conformity with the control commands that are communicated to the lamp-operating appliance 10 via the control line 2. For this purpose, the lamp-operating appliance 10 exhibits a first interface unit 15 which is connected to the control line 2 via a corresponding port 16. The interface unit 15 in this case is designed for the purpose of receiving data according to a first communications protocol—in the present case, according to the DALI standard—and to route them to the control unit 11 which thereupon then undertakes the drive of the light-sources.

To this extent, the configuration of the lamp-operating appliance according to the invention corresponds to that of appliances that are already known. What is now novel is a second interface unit 17 which is connected to a further control line 9 via a second port 18 and is designed to receive data according to a second communications protocol. In the case of these data it is a question, in particular, of programming information that is transmitted from the second interface unit 17 again to the control unit 11. These data may originate in this case, in particular, from a programming appliance—represented, for example, by a personal computer (PC) 8—via which an individual programming of the lamp-operating appliance 10 can be undertaken in a programming mode.

The interface unit 17 may, for example, be designed as a USB interface or as an RS232 interface, in order to be connected to the PC 8 via the control line 9. Also conceivable, however, would be a wireless communication between the programming appliance or PC 8 and the interface 17. In this case the interface unit 17 could also be realized as a Bluetooth interface or as an infrared interface.

The programming information received via the interface unit 17 now serves to influence the behavior of the control unit 11 in the course of driving the light-sources 21, 22, 23 in a manner depending on the control commands received via the first interface unit 15. In particular, the programming information serves to communicate to the control unit 11 the manner in which the incoming control commands are to be responded to—that is to say, how the latter are to be interpreted in order to drive the individual light-sources 21, 22, 23.

In the present exemplary embodiment, in which drive of the lamp-operating appliances 10 is effected by means of DALI commands, this means that a novel function or significance—which, in particular, relates to the setting of the additional parameters of the light-source(s)—is allocated to at least some of the DALI commands. Individual commands can accordingly now be employed for influencing the mixed color generated by the three light-sources 21, 22, 23 or for bringing about a swivelling of the spotlight 20 2.

In the case where use is made of the DALI standard, the programming information communicated in accordance with the invention serves, in particular, to influence the significance of the scene commands of the DALI standard, in order to open up the prospect of further control options. The scene commands of the DALI standard serve initially to preset certain brightness values for the light fixtures, which they are to take on in certain situations. In order at a later time to avoid an elaborate and individual driving of the individual light-sources, scenes of such a type are already saved in advance in the memory of the lamp-operating appliance, in which connection at a later time a communication is then merely sent to the appliance that it is to behave in conformity with one of the stored scenes. In conformity with the data saved in the memory, the lamp-operating appliance then takes on a certain mode of operation and drives the light-sources with a desired brightness.

In a preferred exemplary embodiment of the present invention there is now provision that extended parameter sets, which relate not only to the brightness of the light-source but also to the other setting options, are allocated to these scenes and are again saved in a memory 19 of the lamp-operating appliance 10. In the exemplary embodiment that is represented, the memory 19 is an integral part of the control unit 11; however, it would of course also be possible to design this memory 19 as a separate element within the lamp-operating appliance 10.

FIGS. 3 and 4, which will be elucidated in more detail in the following, show parameter sets of such a type such as are used in accordance with the particularly preferred exemplary embodiment of the present invention. FIG. 3 shows, by way of example, the memory contents of the memory that is arranged in the lamp-operating appliance 10 1 for driving the RGB spotlight 20 1, whereas, on the other hand, FIG. 4 shows, in exemplary manner, the parameter sets for driving the swivelling spotlight 20 2.

Since the DALI standard offers possibility to store a maximum of 16 scenes in advance, the table represented in FIG. 3 accordingly contains 16 parameter sets. Each parameter set now provides information about the intensity of the light emitted in total from the spotlight and also about the proportions of the individual colors. The first parameter set (scene 1) accordingly corresponds to a maximum brightness of the spotlight, the proportions of the various colors being of equal magnitude, so that white mixed light is ultimately emitted. In comparison with this, although in the case of scenes 2, 3 and 4 a maximum brightness is likewise provided, this is achieved in each instance by a single one of the three colors. These scenes consequently correspond to a maximum light output with a single color in each instance. To scene 16 there is again assigned a parameter set, according to which the total intensity is about 50% of the maximum brightness, with the red component predominating in comparison with the green and blue components. Accordingly, a mixed light is emitted which has a reddish tone.

The registering of these parameter sets can be undertaken in straightforward manner by the PC 8, on which diverse settings are input with the aid of an appropriate program, including a suitable graphical user interface, and then transmitted directly to the lamp-operating appliance 20. The effect, resulting from this, on the output of light by the spotlight 20-1 can accordingly be examined immediately. In this way there is the possibility to form individual sets of parameters and to communicate them to the lamp-operating appliance 10, whereby individual sets can also be connected to one another via a temporal routine, in order by this means to form a certain light sequence. A parameter set or a corresponding sequence is then assigned to a desired scene-number and saved in the memory. It is to be noted that in the case of the example in FIG. 3 the parameter values for various angle settings and also for the light distribution are not used, since the spotlight does not offer setting options of such a type.

The programming of the second lamp-operating appliance 10 2 is also effected in like manner, the memory contents according to FIG. 4 now containing a different combination of parameters, since, although the spotlight offers no possibility for changing color, it does enable a change of direction of the light output or an adjustment of the distribution characteristic. Whereas the angles $\alpha$ and $\beta$ in this case define a swivelling of the spotlight in space, the size of the cone of light, for example, is influenced by the "Distribution" value. The parameter set of scene 1 corresponds in this case to a maximum light output in the case of an unadjusted spotlight as well as a cone of light with maximum width. The further scenes 2 to 16 in turn define differing positions of the spotlight as well as cones of light of varying width.

After programming has taken place, the PC 8 can be disconnected from the lamp-operating appliances 10 and hence the programming mode can be terminated. In the later normal operation of the control system 1, the lamp-operating appliance 10 is consequently connected to the control devices 3 and 5 exclusively with the aid of the first interface unit 15 leading to the control line 2 of the DALI bus. These devices 3, 5 now have the possibility to retrieve individual scenes in the preprogrammed lamp-control appliances 10, the scene-selection commands available in the DALI standard being utilized for this purpose. By this means, the individual settings that were saved in the memory 19 can accordingly be retrieved, in order to undertake adjustments of the spotlights 20 1, 20 2. The scene commands in this case are accordingly utilized not only for retrieving the brightness, adjusted in advance, of a light-sources but instead also for undertaking a color selection or a directional adjustment of the spotlight.

One advantage of the solution according to the invention consists in the fact that the classical DALI command set can continue to be employed for the purpose of driving the various lamp-operating appliances. Each light-fixture unit that is newly added to the system can be individually programmed, in order to undertake a setting of the light-fixture-specific parameters within the scope of the scene commands. The drive of the further light fixtures already present in the system is not influenced by this. Accordingly, totally new types of light fixtures can also be added in straightforward manner and, despite everything, driven in a convenient manner. It should be added that, instead of the DALI command set for the purpose of data transfer in accordance with the first communications protocol, other command sets could of course also be employed. For example, a drive conforming to the DMX standard would also be possible.

The invention claimed is:

1. A lamp-operating appliance for operating one or more light-sources, comprising:

a) a first interface unit for connecting the lamp-operating appliance to a control line and also for receiving external control commands conforming to the Digital Addressable Lighting Interface (DALI) standard, b) a control unit that operates the light-source(s) in a manner depending on the control commands received via the first interface unit, and c) a second interface unit for receiving programming information in accordance with a second communications protocol, wherein the programming information relates to the conversion of scene commands of the DALI standard by the control unit, wherein the conversion of the control commands, received via the first interface unit, for operating the light-source (s) are effected by the control unit at least partly by taking account of the programming information.

2. A lamp-operating appliance according to claim 1, wherein the second interface unit is connectable to a data-transmission line that is separate from the control line.

3. A lamp-operating appliance according to claim 2, wherein the second interface unit is a USB interface.

4. A lamp-operating appliance according to claim 2, wherein the second interface unit is an RS232 interface.

5. A lamp-operating appliance according to claim 1, wherein the second interface unit is capable of wireless reception of the programming information.

6. A lamp-operating appliance according to claim 5, wherein the second interface unit is a Bluetooth interface or an infrared interface.

7. A lamp-operating appliance according to claim 1, wherein the appliance comprises several control outputs for driving heterochromatic light-sources.

8. A lamp-operating appliance according to claim 1, wherein the appliance comprises a control output for driving an adjusting apparatus for the light-source.

9. A lamp-operating appliance according to claim 1, wherein the appliance comprises a memory for saving parameter sets that each define various adjustments of the light-source(s) and are each assigned to a scene.

10. A lamp-operating appliance according to claim 1, wherein several parameter sets are combined into a temporal sequence, this sequence being assigned to an individual scene.

11. A control system for operating light fixtures, comprising a control device for generating control commands, a control line connected to the control device, and at least one lamp-operating appliance connected to the control line, wherein the lamp-operating appliance is configured in accordance with claim 1.

12. A process for operating a lamp-operating appliance for one or more light-sources, comprising:

communicating external control commands for operating the light-sources to the lamp-operating appliance via a first interface unit in conformity with the Digital Addressable Lighting Interface (DALI) standard, and effecting a drive of the light-sources in accordance with the control commands received at least partly by taking account of programming information that is communicated to the lamp-operating appliance via a further interface unit in accordance with a second communications protocol, wherein the programming information relates to the conversion of scene commands of the DALI standard by the control unit.

13. A process according to claim 12, comprising a memory saving parameter sets that each define various adjustments of the light-source(s) and are each assigned to a scene.

14. A process according to claim 13, comprising combining several parameter sets into a temporal sequence, and assigning this sequence to an individual scene.

15. A process according to claim 13, wherein at least some of the parameters relate to a color control of the light-source (s).

16. A process according to claim 13, wherein at least some of the parameters relate to a positioning and/or influencing of the emission of light of the light-source.

17. A process according to claim 12, comprising effecting the communication of the programming information in a programming mode of the lamp-operating appliance.

* * * * *